United States Patent
Yang et al.

(10) Patent No.: US 10,560,012 B1
(45) Date of Patent: Feb. 11, 2020

(54) ZVS CONTROL CIRCUIT FOR USE IN A FLYBACK POWER CONVERTER

(71) Applicant: RICHTEK TECHNOLOGY CORPORATION, Zhubei, Hsinchu (TW)

(72) Inventors: Ta-Yung Yang, Taoyuan (TW); Tzu-Chen Lin, ChangHua (TW); Chien-Fu Tang, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/247,520

(22) Filed: Jan. 14, 2019

Related U.S. Application Data

(60) Provisional application No. 62/711,455, filed on Jul. 27, 2018.

(51) Int. Cl.
*H02M 3/335* (2006.01)
*H02M 1/08* (2006.01)

(52) U.S. Cl.
CPC ....... *H02M 1/083* (2013.01); *H02M 3/33592* (2013.01)

(58) Field of Classification Search
CPC .. H02M 3/33592; H02M 1/083; H02M 3/335; H02M 2001/002
USPC ........ 363/116–19, 21.04, 21.07, 21.8, 21.12, 363/21.14, 21.17, 21.18
See application file for complete search history.

(56) References Cited

U.S. PATENT DOCUMENTS

| | | | | |
|---|---|---|---|---|
| 7,869,231 B2* | 1/2011 | Cohen | ............... | H02M 3/33592 363/21.14 |
| 8,094,468 B2* | 1/2012 | Yang | .................. | H02M 3/3376 363/21.01 |
| 8,526,202 B2* | 9/2013 | Fang | ................. | H02M 3/33592 363/127 |
| 9,935,559 B2* | 4/2018 | Kong | ...................... | H02M 1/08 |
| 2009/0129125 A1* | 5/2009 | Yang | ................. | H02M 3/33592 363/21.14 |
| 2016/0172962 A1* | 6/2016 | Chen | ................. | H02M 3/33592 363/21.14 |
| 2017/0085183 A1* | 3/2017 | Notsch | ............. | H02M 3/33507 |
| 2017/0244332 A1* | 8/2017 | Leong | ............... | H02M 3/33523 |

* cited by examiner

*Primary Examiner* — Rajnikant B Patel
(74) *Attorney, Agent, or Firm* — Tung & Associates

(57) ABSTRACT

A ZVS (zero voltage switching) control circuit for use in a flyback power converter includes a primary side controller and a secondary side controller. The primary side controller generates a switching signal to control a power transformer through a power transistor to generate an output voltage. The secondary side controller generates an SR (synchronous rectifier) signal to control an SR transistor at a secondary side of the power transformer. The SR signal includes an SR-control pulse and a ZVS pulse. The SR-control pulse controls the SR transistor according to a demagnetizing period of the power transformer. The ZVS pulse determines the starting timing of the switching signal to achieve zero voltage switching for the power transistor. The secondary side controller generates the ZVS pulse after a delay time from when the power transformer is demagnetized. The delay time is determined according to an output load of the output voltage.

14 Claims, 13 Drawing Sheets

ZVS CONTROL CIRCUIT FOR USE IN A FLYBACK POWER CONVERTER

CROSS REFERENCE

The present invention claims priority to U.S. 62/711,455, filed on Jul. 27, 2018.

BACKGROUND OF THE INVENTION

Field of Invention

The present invention relates to a control circuit for use in a flyback power converter; particularly, it relates to a ZVS (Zero Voltage Switching) control circuit for use in a flyback power converter.

Description of Related Art

FIG. 1 shows a prior art flyback power converter (flyback power converter 1), wherein a primary side controller circuit 80 controls a power transistor 20 to operate a power transformer 10 to generate an output voltage VO. A secondary controller circuit 90 generates an SR (synchronous rectifier) signal SG to control a synchronous rectifier transistor 50 for synchronous rectification at the secondary side. "Synchronous rectification" means that the synchronous rectifier transistor 50 is ON in substantially complementary phase to the ON-time of the power transistor 20 in continuous conduction mode (CCM), or is ON during a demagnetizing period of the power transformer 10 in discontinuous conduction mode (DCM), so that the secondary side current loop is conducted in synchronization with the OFF-time of the power transistor 20 or the demagnetizing period of the power transformer 10.

The prior art in FIG. 1 has a drawback that, although it is intended for the synchronous rectifier transistor 50 at the to be synchronized with the power transistor 20 at the primary side, such synchronization is not precisely achieved. Another drawback is that the power transistor 20 is not well controlled to turn ON at a time point when the voltage difference across its drain and source is substantially zero (referred to as "zero voltage switching" or "ZVS" hereinafter), so the power conversion efficiency is not optimized.

Compared to the prior art in FIG. 1, the present invention is advantageous in that the synchronous rectifier transistor 50 is precisely synchronized with the power transistor 20. In addition, the power conversion efficiency is improved since the power transistor 20 is zero voltage switching. These are achieved by means of a ZVS pulse in the SR signal, wherein the ZVS pulse determines the switching frequency.

SUMMARY OF THE INVENTION

From one perspective, the present invention provides a zero voltage switching (ZVS) control circuit, configured to operably control a flyback power converter including a power transformer having a primary side and a secondary side, the ZVS control circuit comprising: a primary side controller circuit, configured to operably generate a switching signal according to a feedback signal, wherein the switching signal controls a power transformer through a power transistor at the primary side to generate an output voltage at the secondary side; and a secondary side controller circuit, configured to operably generate the feedback signal, and generate an SR signal to control a synchronous rectifier transistor at the secondary side, wherein the SR signal includes an SR-control pulse and a ZVS pulse, wherein the SR-control pulse controls the synchronous rectifier transistor in response to a demagnetizing period of the power transformer, and wherein the ZVS pulse controls the power transformer through the synchronous rectifier transistor to determine a timing for starting the switching signal to achieve zero voltage switching for the power transistor.

In one embodiment, the secondary side controller circuit generates the ZVS pulse after a delay time from an end of a demagnetizing period within which the power transformer is substantially demagnetized, wherein the delay time is determined in accordance with an output load of the output voltage, and the delay time is increased as the output load of the output voltage is decreased.

In one embodiment, the delay time is determined according to a time length of the demagnetizing period of the power transformer.

In one embodiment, the ZVS control circuit further comprises an opto-coupler configured to operably couple the feedback signal from the secondary side controller circuit to the primary side controller circuit to control a pulse width of the switching signal, wherein the feedback signal is generated in accordance with the output voltage.

In one embodiment, a switching frequency of the switching signal is determined by the ZVS pulse.

In one embodiment, the secondary side controller circuit generating the ZVS pulse and the primary side controller circuit generating the switching signal are synchronized by the time length of the demagnetizing period of the power transformer.

In one embodiment, the primary side controller circuit includes an oscillator configured to operably generate an oscillation signal which determines the switching frequency of the switching signal when the output load of the output voltage is lower than a light-load threshold.

In one embodiment, the oscillation signal is generated in accordance with the feedback signal.

In one embodiment, the switching period of the switching signal is determined according to the feedback signal when the output load of the output voltage is lower than a light-load threshold.

In one embodiment, the secondary side controller circuit is configured to operably receive a secondary side power transformer signal, and the ZVS pulse is generated when the secondary side power transformer signal is lower than an SR threshold.

In one embodiment, the secondary side controller circuit further includes a first counter which is configured to operably count a first number according to a first valley signal; wherein the first valley signal is generated when the secondary side power transformer signal is lower than an SR threshold, and the secondary side controller circuit disables generation of the ZVS pulse when the first number exceeds a first number threshold.

In one embodiment, the primary side controller circuit is coupled to the power transformer to receive a primary side power transformer signal, and the primary side controller circuit enables to start the switching signal after a ZVS pulse detected signal is detected; wherein the ZVS pulse detected signal is generated according to a level of the primary side power transformer signal, and the level of the primary side power transformer signal rises at the start of the ZVS pulse.

In one embodiment, the primary side controller circuit is coupled to the power transformer to receive a primary side power transformer signal; wherein the primary side controller circuit will not start the switching signal unless the primary side power transformer signal is lower than a demagnetizing threshold.

In one embodiment, the primary side controller circuit further includes a second counter configured to operably count a second number in response to a second valley signal, wherein the second valley signal is generated when the primary side power transformer signal is lower than a demagnetizing threshold; and when the second number exceeds a second number threshold, the primary side controller circuit does not generate the switching signal in response to the ZVS signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
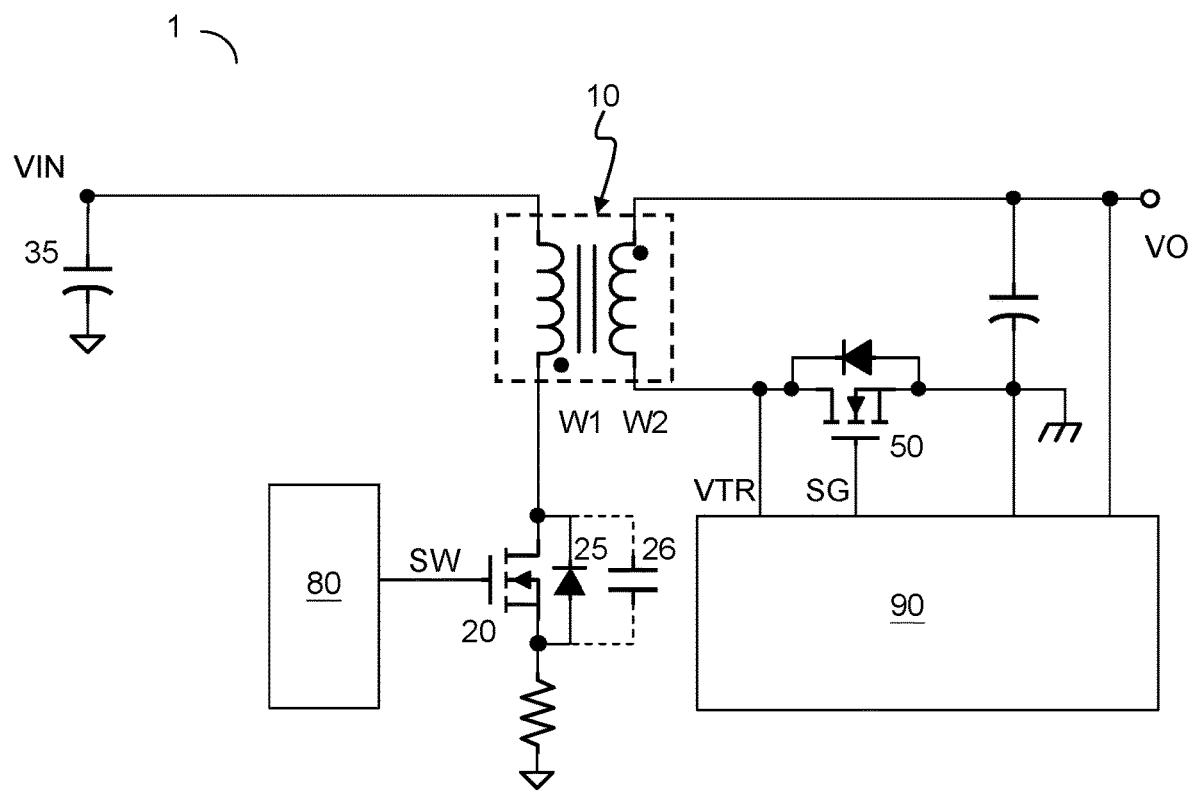
FIG. 1 shows a schematic diagram of a prior art flyback power converter.
Figure 2:
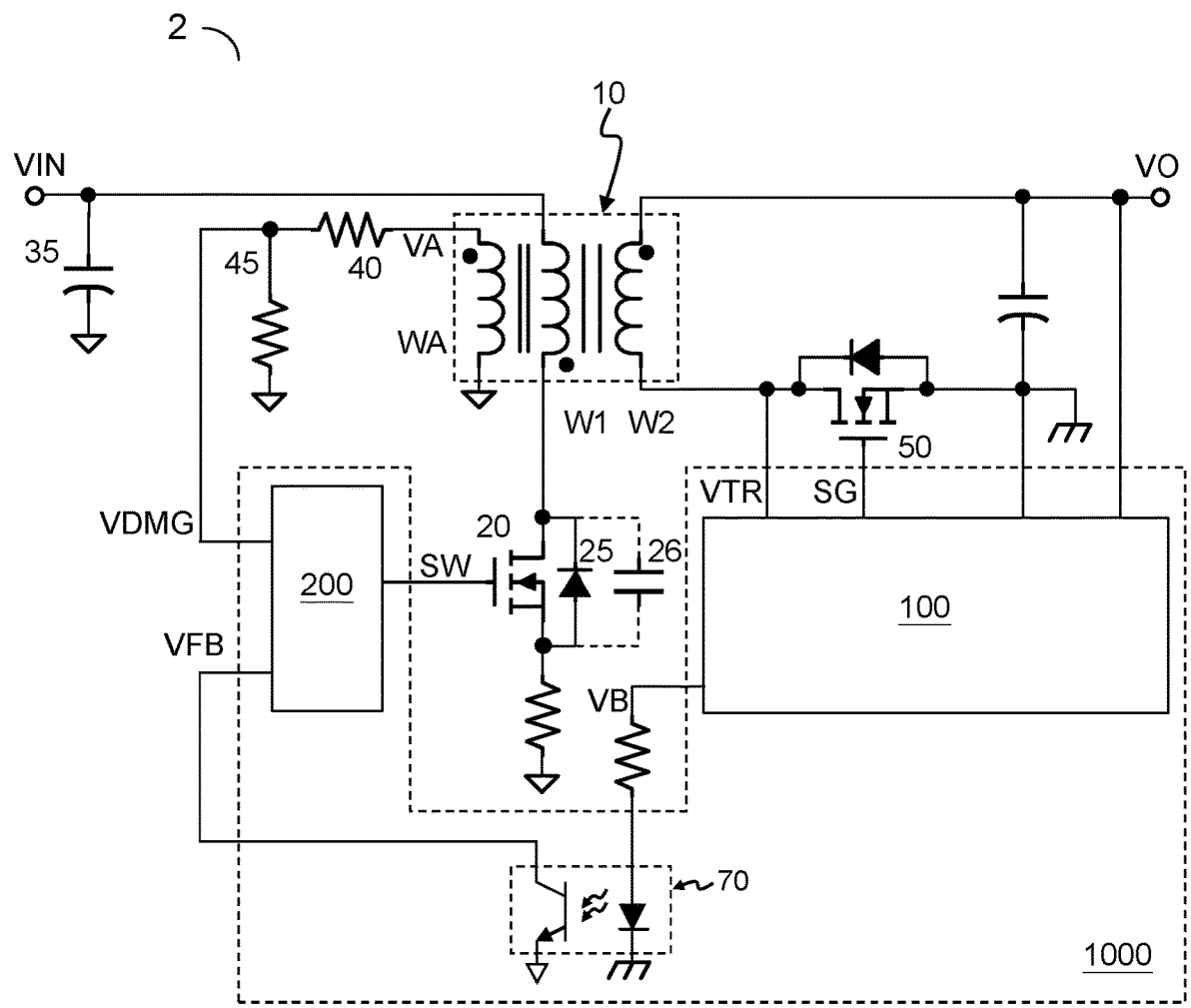
FIG. 2 shows a schematic diagram of an embodiment of the ZVS control circuit according to the present invention.

FIG. 2 shows a ZVS control circuit (ZVS control circuit 1000) of a flyback power converter 2. The ZVS control circuit 1000 includes a primary side controller circuit 200 which generates a switching signal SW. The switching signal SW controls a power transformer 10 through a power transistor 20 to generate an output voltage VO. More specifically, the switching signal SW controls the power transistor 20 to switch the primary side winding W1 of the power transformer 10, so as to convert an input voltage VIN to the output voltage VO. A secondary side controller circuit 100 generates a feedback signal VB and a synchronous rectifier (SR) signal SG. The SR signal SG controls a synchronous rectifier transistor 50 by an SR-control pulse (see FIGS. 3A-3B) for synchronous rectification. In one embodiment, the ZVS control circuit 1000 further includes an opto-coupler 70 which generates a feedback related signal VFB according to the feedback signal VB from the secondary side controller circuit 100 and sends the feedback related signal VFB to the primary side controller circuit 200; in one embodiment, the pulse width of the switching signal SW is determined according to the feedback related signal VFB.

In one embodiment, the feedback signal VB and the feedback related signal VFB are generated in accordance with the output voltage VO. The SR-control pulse is generated in response to the demagnetizing period of the power transformer 10. The primary side controller circuit 200 receives a primary side transformer signal VDMG through for example resistors 40 and 45. More specifically, in this embodiment, the primary side transformer signal VDMG is a voltage division (through the voltage divider formed by resistors 40 and 45) of an auxiliary voltage VA generated by an auxiliary winding WA of the power transformer 10.

The secondary side controller circuit 100 is coupled to the power transformer 10 (e.g. through the secondary side winding W2) to receive a secondary side transformer signal VTR. The SR signal SG further includes a ZVS pulse (see FIGS. 3A-3B) which controls the power transformer 10 through the synchronous rectifier transistor 50, so that the turned-ON timing of the switching signal SW is well controlled achieve zero voltage switching of the power transistor 20.

The term "zero voltage switching" refers to a condition that: before a transistor (such as 20) is turned ON, the parasitic capacitor of the transistor (e.g. the parasitic capacitor 26 across the drain and source of the transistor 20) is substantially discharged to 0V by a circulation current through a lossless path (such as the primary side winding W1) and the parasitic diode (such as the parasitic diode 25 of the transistor 20) is forward-conductive by the circulation current, and the charges of the parasitic capacitor for example can be transferred to a storage device (such as the input capacitor 35), such that when the transistor is turned ON in the next cycle, the drain-source voltage of the transistor is substantially 0V. Since the charges on the parasitic capacitor is not discharged through the transistor which has a conduction resistance, the power conversion efficiency can be improved.

Note that: although the parasitic capacitor being discharged to 0V is preferred, however due to non-idealities caused by for example imperfection of components or imperfect matching among components, the voltage of the parasitic capacitor may not be discharged exactly to 0V, but just close to the 0V. In other words, according to the present invention, a certain level of error between 0V and the voltage on the parasitic capacitor after discharge is acceptable, and therefore the term "substantially" is used to mean that an insignificant error within a tolerable range is acceptable.

Figure 3A:
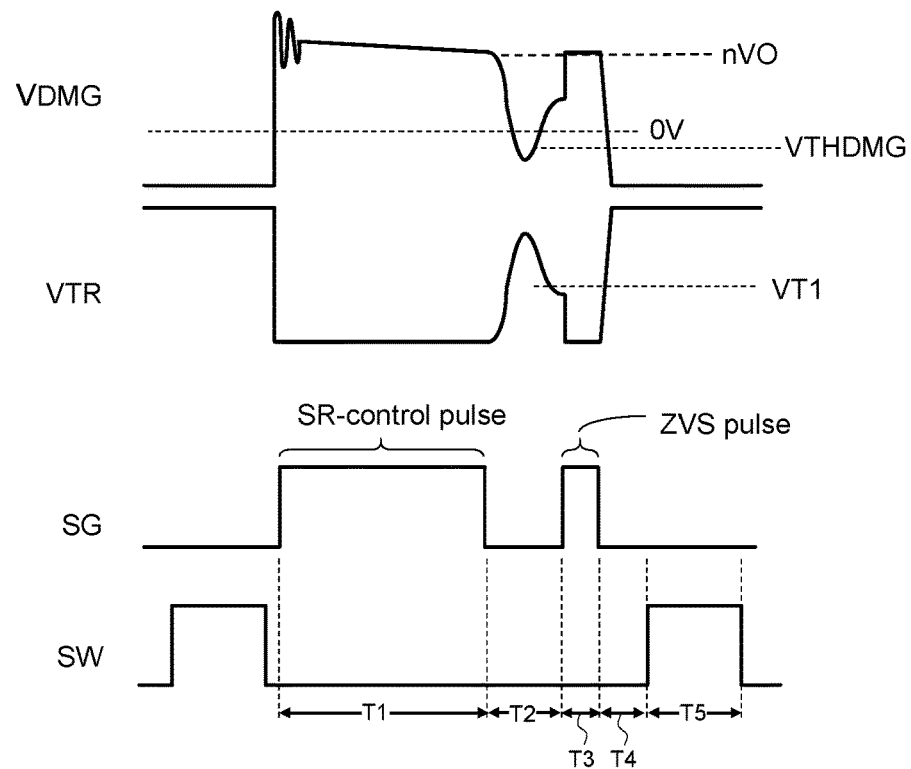
FIGS. 3A-3B show waveforms corresponding to the embodiment of the ZVS control circuit according to the present invention shown in FIG. 2.
Figure 3B:
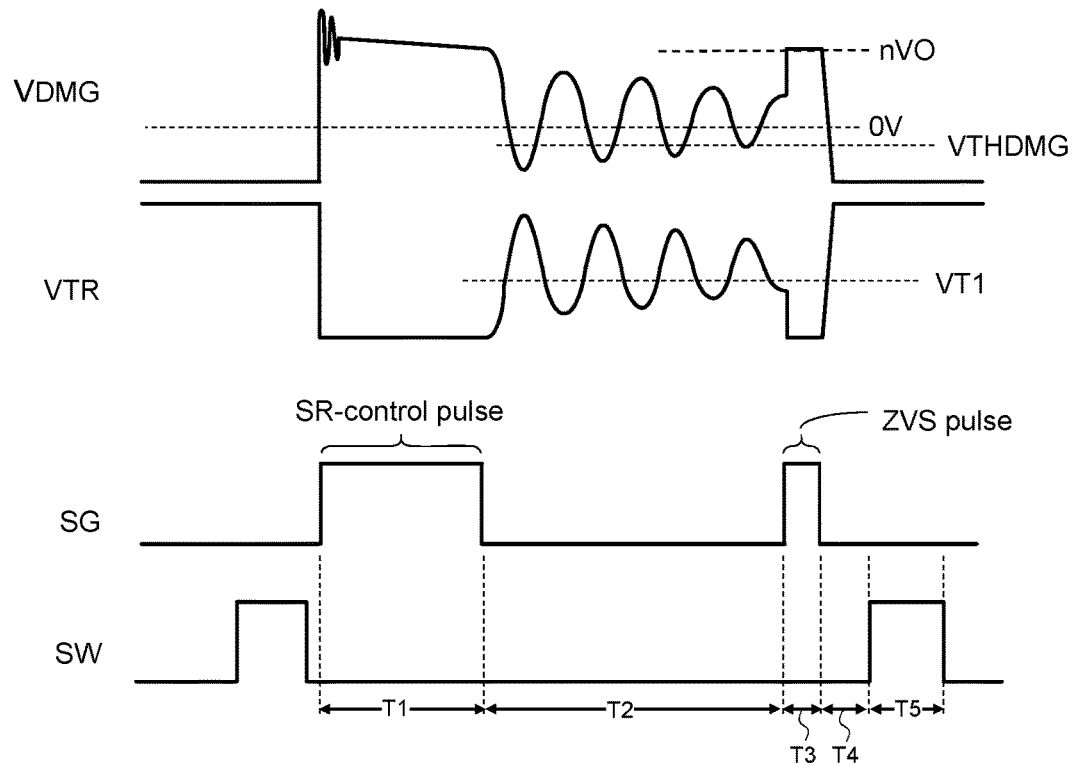

FIGS. 3A-3B show waveforms corresponding to the embodiment of the ZVS control circuit shown in FIG. 2. The secondary side controller circuit 100 generates the ZVS pulse in the SR signal SG during T3 after a delay time T2 from when the power transformer is substantially demagnetized (i.e. from the end of the demagnetizing period T1). More specifically, in the embodiments as shown in FIGS. 3A and 3B, the delay time T2 starts from the end time point of T1. The delay time T2 is determined in accordance with an output load of the output voltage VO. The output load refers to the current level or the power level of a load coupled to the output terminal of the flyback power converter 2 (i.e., coupled to the output voltage VO). In one embodiment, the delay time T2 is decreased in response to the increase of the output load of the output voltage VO, and the delay time T2 is increased in response to the decrease of the output load of the output voltage VO. In one embodiment, when for example but not limited to operating in DCM, when the output load of the output voltage VO is decreased, the pulse width (T5) of the switching signal SW and the pulse width (T1) of the SR-control pulse (which corresponds to the demagnetizing period of the power transformer 10) are decreased.

In the shown examples in FIGS. 3A-3B, the output load of the output voltage VO in FIG. 3B is lower than that in FIG. 3A, and according to the present invention, the delay time T2 in FIG. 3B is configured to be longer than that in FIG. 3A. Also note that, the flyback power converter operate in DCM both in FIGS. 3A and 3B.

Still referring to FIGS. 3A-3B, when the secondary side controller circuit 100 generates the ZVS pulse in the SR signal SG during T3, the transformer 10 will generate a peak voltage as shown in the primary side transformer signal VDMG (during T3). The level of the peak voltage is correlated to the level of the output voltage VO. Therefore, the primary side controller circuit 200 can detect this peak voltage of the primary side transformer signal VDMG generated during T3 to obtain information of the output voltage VO, and to determine when to turn ON the power transistor 20 (i.e., to determine the turned-ON timing of the switching signal SW).

Figure 4A:
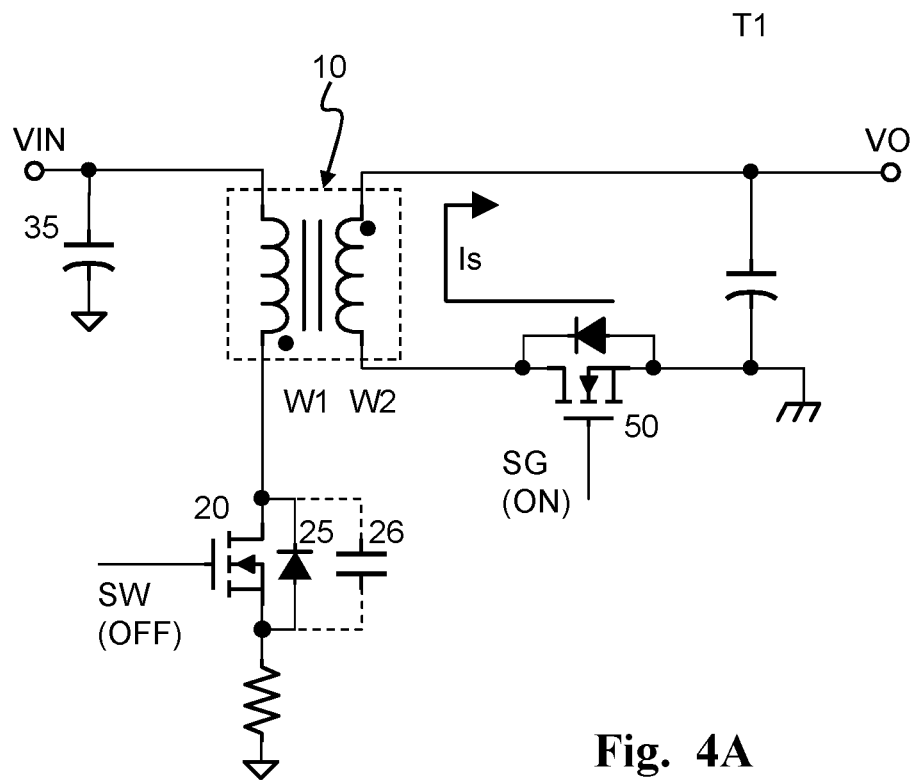
FIGS. 4A-4D show signal flows corresponding to the periods T1-T4 shown in FIGS. 3A-3B.

FIGS. 4A-4D show signal flows corresponding to T1-T4 shown in FIGS. 3A-3B. T1 is the demagnetizing period of the power transformer 10. As shown in FIG. 4A, the SR-control pulse of the SR signal SG is enabled for synchronous rectification during T1 and the synchronous rectifier transistor 50 is turned ON by the SR-control pulse (i.e. T1 as shown in FIGS. 3A and 3B). The power transformer 10 induces a circulation current Is through the secondary side winding W2 during T1 as shown in FIG. 4A.

Figure 4B:
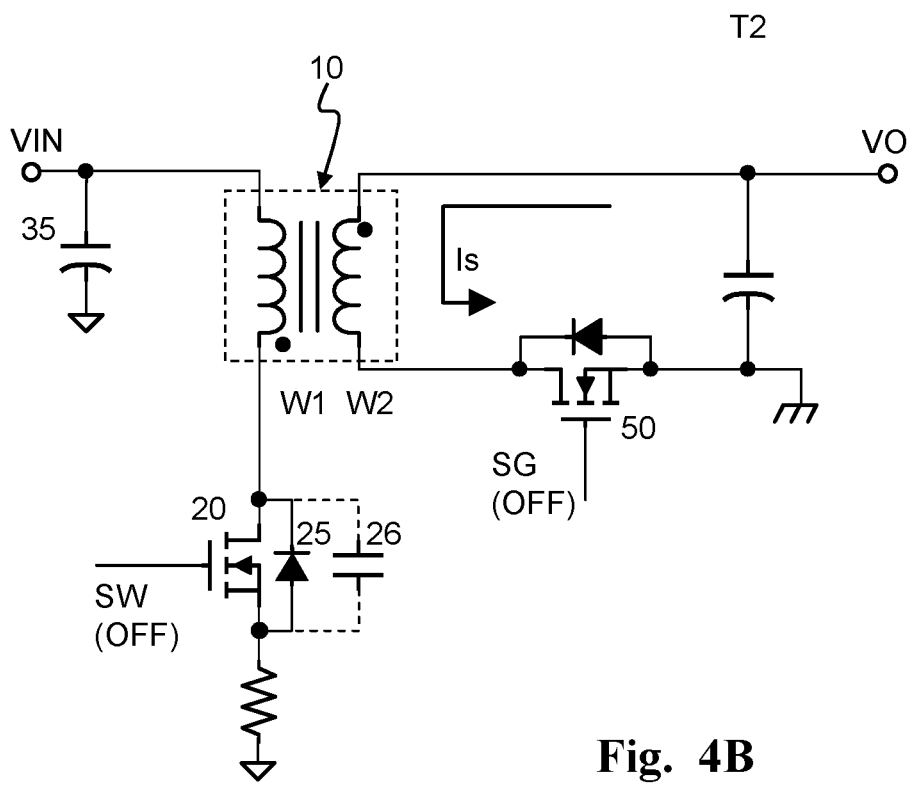

T2 is the delay time. As shown in FIG. 4B, both the power transistor 20 and the synchronous rectifier transistor 50 are OFF.

Figure 4C:
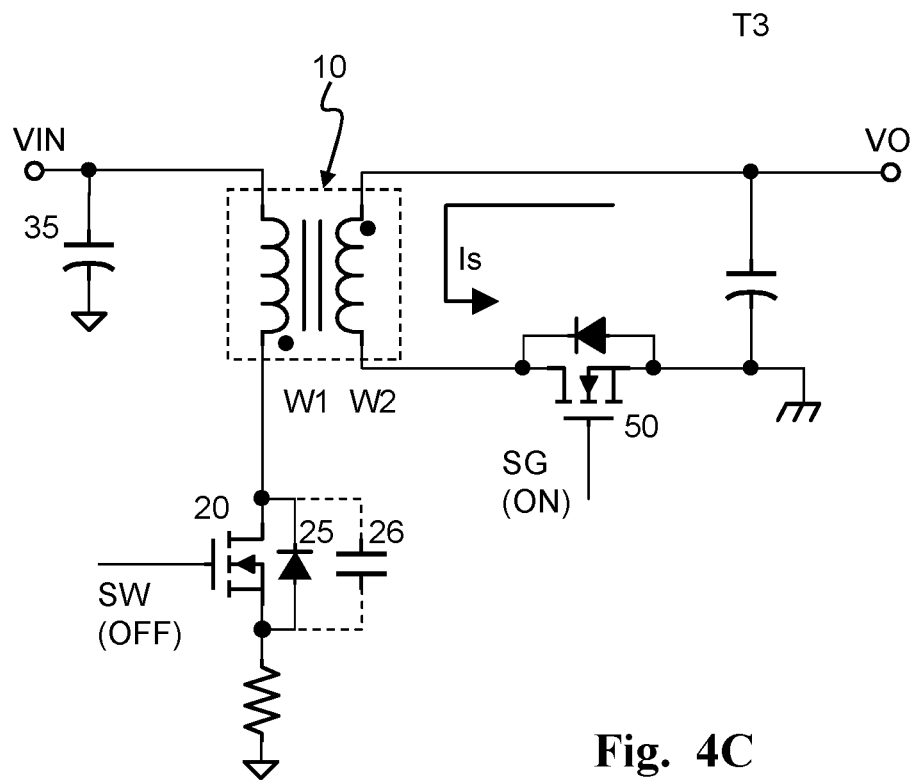

T3 is the pulse width of the ZVS pulse in the SR signal SG. As shown in FIG. 4C, energy is stored into the transformer 10 during T3 when the rectifier transistor 50 is turned ON for the second time (i.e. T3—the ZVS pulse) during the OFF time of the power transistor 20.

Figure 4D:
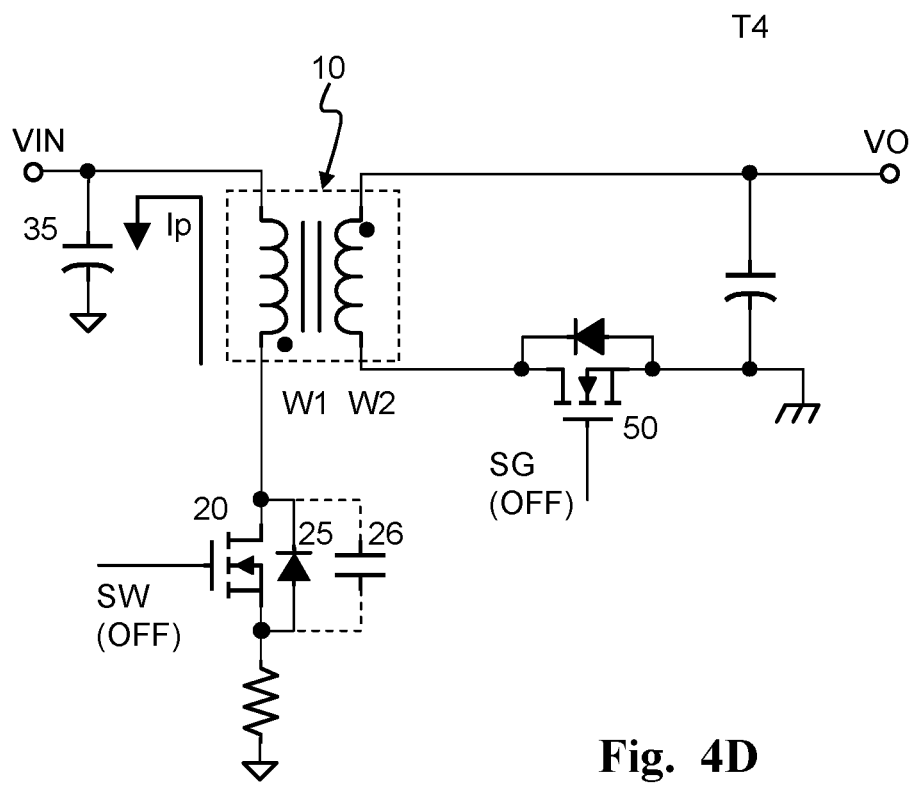

As shown in FIG. 4D, a circulation current Ip of the transformer 10 discharges the parasitic capacitor 26 through the body diode 25 of the power transistor 20 during 14 (dead time) before the switching signal SW is turned ON. The time length of the dead time T4 is not critical and can be predetermined, as long as it is certain that the parasitic capacitor 26 can be sufficiently discharged to therefore achieve zero voltage switching for the power transistor 20 when it is turned on during T5. More specifically, the circulated current Ip of the transformer 10 is generated (or released) from the energy stored into the transformer 10 during T3.

As briefly described above, the peak voltage of the primary side transformer signal VDMG generated during T3 can be detected by the primary side controller circuit 200 to obtain information of the ZVS pulse (T3), which can be utilized to determine the turned-ON timing of the switching signal SW. Therefore in this embodiment, from one perspective, the switching frequency of the switching signal SW is determined by the secondary side controller circuit 100 by generating the ZVS pulse in the SR signal SG during the T3.

Figure 5:
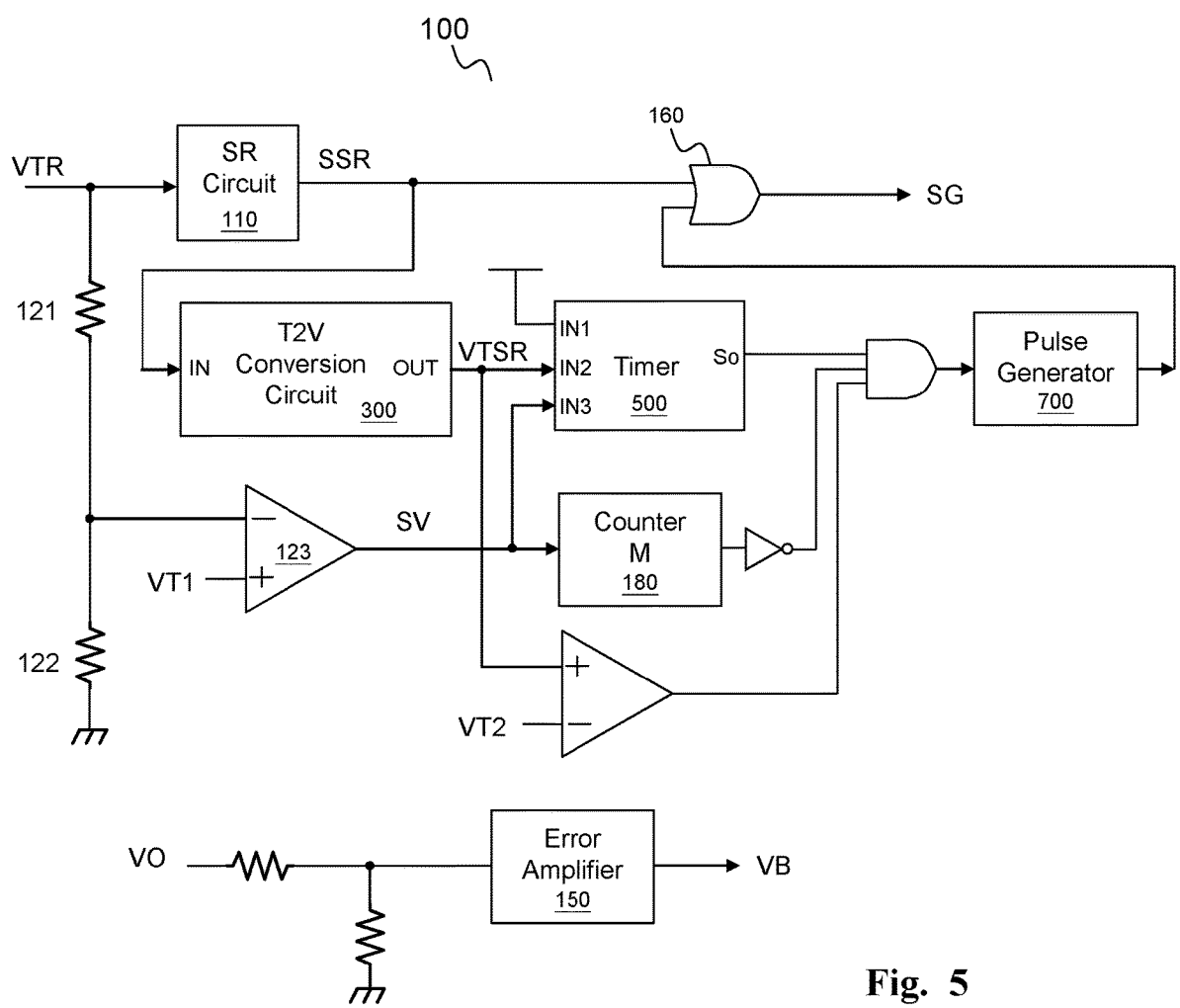
FIG. 5 shows a schematic diagram of an embodiment of the secondary side controller circuit for use in the ZVS control circuit according to the present invention.

FIG. 5 is a preferred embodiment of the secondary side controller circuit 100. The secondary side controller circuit 100 includes an SR circuit 110 which generates a synchronous rectifier signal SSR in accordance with the time length of the demagnetizing period of the power transformer 10. The synchronous rectifier signal SSR is generated according to the secondary side transformer signal VTR, which is related to the voltage-drop across the synchronous rectifier transistor 50. The synchronous rectifier signal SSR is coupled to a T2V (time to voltage) conversion circuit 300 to generate a voltage signal VTSR. The level of the voltage signal VTSR is correlated to the period of the synchronous rectifier signal SSR. The T2V conversion circuit 300 converts a time length (the period of the synchronous rectifier signal SSR) to a voltage (the level of the voltage signal VTSR). In one embodiment, the level of the voltage signal VTSR is positively correlated to the period of the synchronous rectifier signal SSR. The voltage signal VTSR is further coupled to a timer circuit 500 to determine the delay time T2. More specifically, the timer circuit 500 generates a timing signal T2R according to the voltage signal VTSR, wherein the timing signal T2R indicates the delay time T2. A shorter synchronous rectifier signal SSR will generate a longer delay time T2 according the present invention. Note that in one embodiment, the synchronous rectifier signal SSR, the demagnetizing period of the power transformer 10 and the output load of the output voltage VO are positively correlated to one another. Therefore, as described earlier, the delay time T2 is increased in response to the decrease of the output load of the output voltage VO (corresponding to a shorter synchronous rectifier signal SSR). And hence, from another perspective, the delay time T2 is determined according to the time length (i.e. the time period T1) of the demagnetizing period of the power transformer 10.

Still referring to FIG. 5, in one embodiment, resistors 121 and 122 receive and divide the secondary side power transformer signal VTR, and a comparator 123 generates a valley signal SV when the secondary side power transformer signal VTR is lower than an SR threshold VT1. The valley signal SV is coupled to the timer circuit 500 to generate the ZVS pulse in the SR signal SG. In other words, the ZVS pulse is generated when the secondary side power transformer signal VTR is lower than the SR threshold VT1, which will, from one perspective, achieve the zero voltage switching for the synchronous rectifier transistor 50 to improve efficiency of the flyback power converter.

Still referring to FIG. 5, in one embodiment, the valley signal SV is further coupled to a counter 180 which is configured to operably count a number (referred to as "first number" hereinafter) in response to the valley signal SV. That is, the counter 180 counts the number of occurrences of the valley signal SV. The counter 180 will disable the generation of the ZVS pulse in the SR signal SG when the first number exceeds a first number threshold M. In one embodiment, M is a positive integer (for example but not limited to 7). When the first number exceeds the first number threshold M, it indicates that the output load of the output voltage VO is at a very light-load condition in which the secondary side power transformer signal VTR rings for a longer period of time. In this case, the power conversion efficiency can be further improved by disabling the generation of the ZVS pulse. As shown in FIG. 5, in this embodiment, a pulse generator 700 generates the ZVS pulse in the SR signal SG through an OR gate 160, to control the generation of the ZVS pulse.

Still referring to FIG. 5, in one embodiment, the secondary side controller circuit 100 further includes an error amplifier 150 which is configured to operably generate the feedback signal VB according to the output voltage VO. In one embodiment, the error amplifier 150 generates the feedback signal VB according to a division of the output voltage VO as shown in FIG. 5.

Figure 6A:
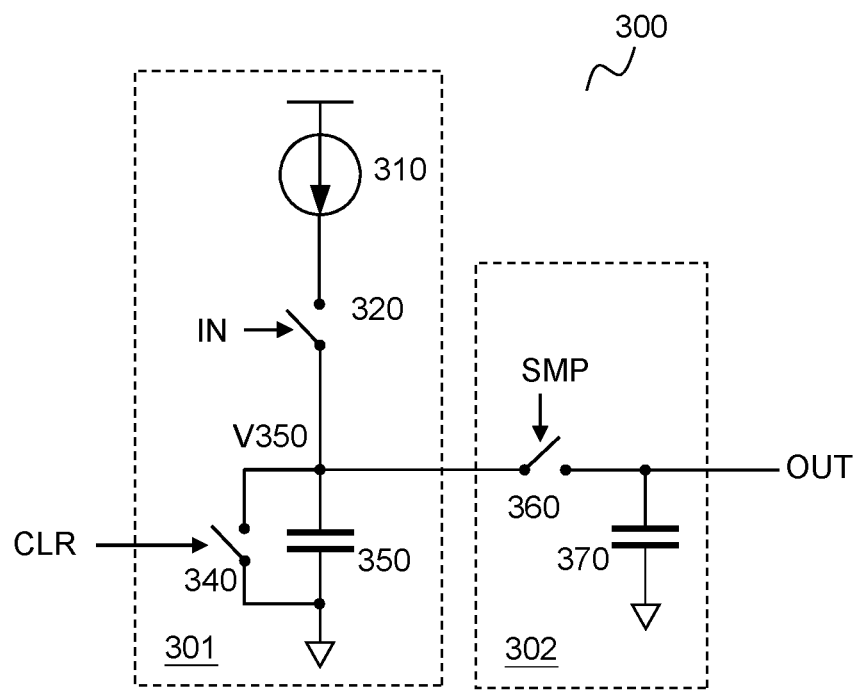
FIGS. 6A-6B show a schematic diagram and corresponding waveforms of an embodiment of the T2V conversion circuit for use in the ZVS control circuit according to the present invention.
Figure 6B:
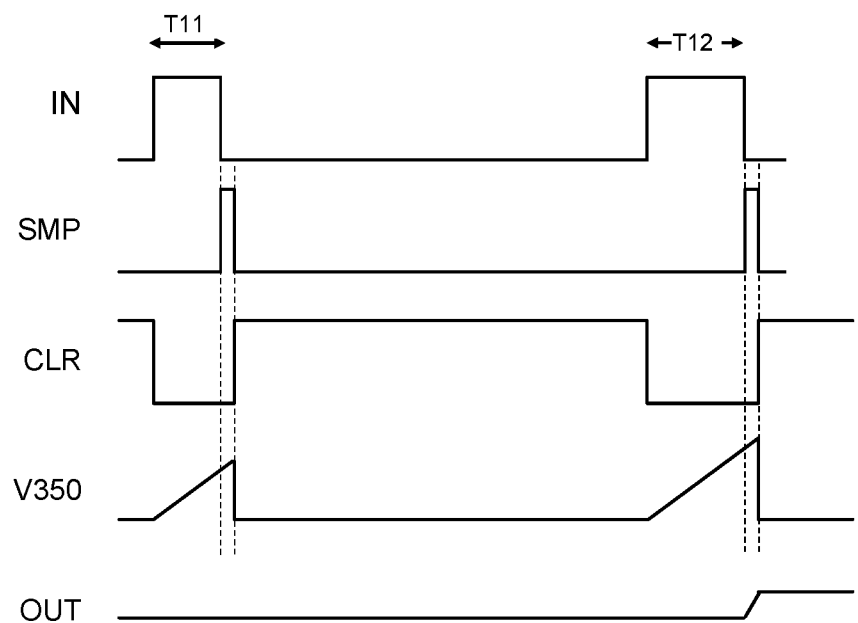

FIG. 6A-6B show a circuit diagram and the corresponding operation waveforms of one embodiment of the T2V conversion circuit (for example corresponding to the T2V conversion circuit 300 in FIG. 5). The T2V conversion circuit 300 includes an integrator circuit 301 and a sample-and-hold (S/H) circuit 302. In this embodiment, the integrator circuit 301 includes a current source 310, switches 320 and 340 and a capacitor 350. The integrator circuit 301 is configured to operably convert the period (i.e. time length) of the input signal IN (for example corresponding to the synchronous rectifier signal SSR in FIG. 5) to the voltage V350 on one node of the capacitor 350 by an integrating operation employing the current source 310, switches 320 and 340 and the capacitor 350. In this embodiment, when the period of the input signal IN is longer, the peak of the voltage V350 will be higher, and when the period of the input signal IN is shorter, the peak of the voltage V350 will be lower. The S/H circuit 302 includes a switch 360 and a capacitor 370 which are configured to operably sample and hold the voltage V350 to generate the voltage signal OUT (for example corresponding to voltage signal VTSR in FIG. 5), as shown in FIGS. 6A and 6B. Note that the level of the voltage signal OUT relates to the time length of the active level (e.g. high level in this embodiment) of the input signal IN. In this embodiment, when the period of the input signal IN is longer, the voltage signal OUT will be higher, and when the period of the input signal IN is shorter, the voltage signal OUT will be will be lower. The clear signal CLR discharges the voltage on the capacitor 350. The sampling control signal SMP controls the switch 360 for such sample-and-hold operation.

Figure 7:
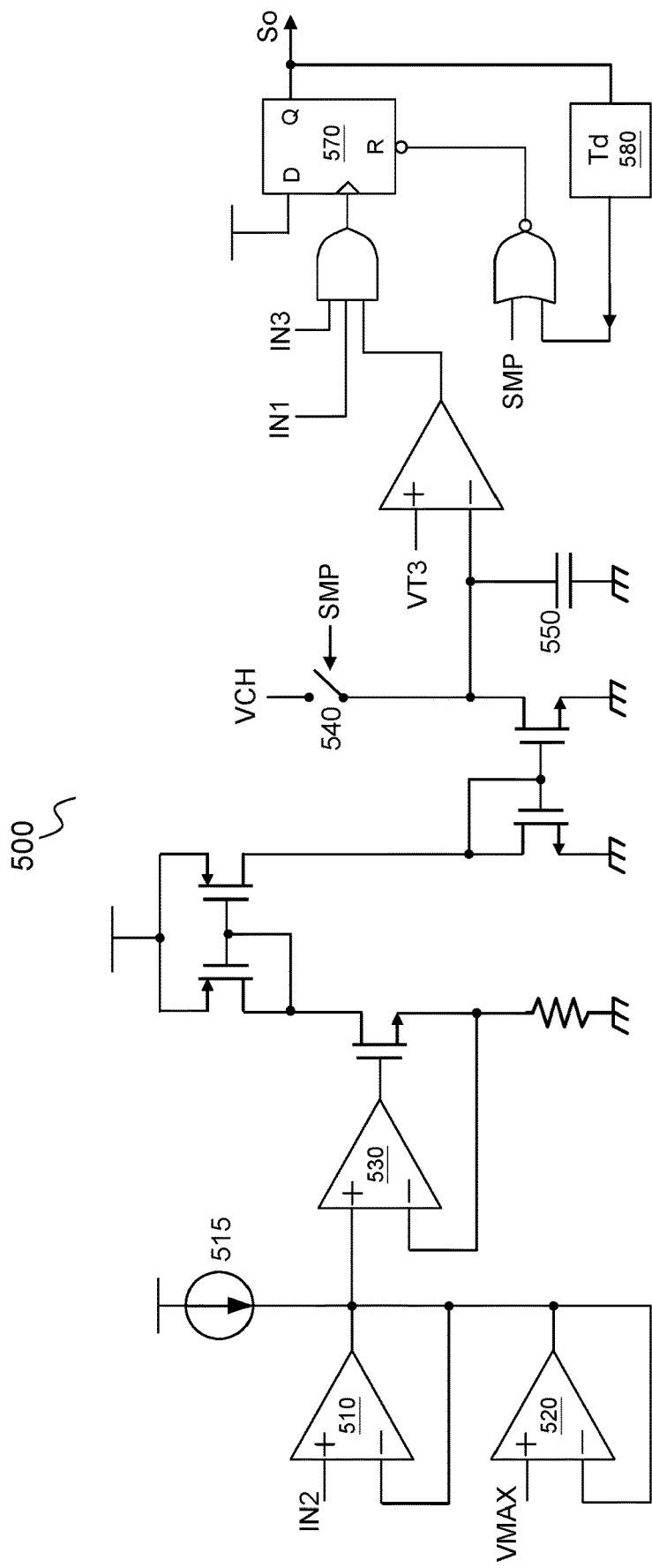
FIG. 7 shows a schematic diagram of an embodiment of the timer circuit for use in the ZVS control circuit according to the present invention.

FIG. 7 is a circuit diagram of a preferred embodiment of the timer circuit (e.g. corresponding to the timer circuit 500 shown in FIG. 5). Operational amplifiers 510, 520 are connected in open-drain form and are pulled high by a current source 515. A reference voltage VMAX is applied to limit the minimum value of the delay time T2, and therefore limit the maximum frequency of the switching signal SW. A threshold voltage VT3 can be utilized to adjust the delay time T2. Note that, in this embodiment, when the input signal IN2 of the timer circuit 500 is higher (corresponding to a longer T1), the output signal So (corresponding to the delay time T2) is shorter, and when the input signal IN2 of the timer circuit 500 is lower, the output signal So is longer. In this embodiment, the sampling control signal SMP controls the switch 540 to pre-charge the capacitor 550. In this embodiment, the sampling control signal SMP and a delay circuit 580 control the reset timing of a state circuit (e.g. flip-flop 570) which generates the output signal So. Note that the flip-flops illustrated in this and other embodiments of the present invention are only given as examples, and they can be alternatively embodied by other kinds of state circuits.

Figure 8:
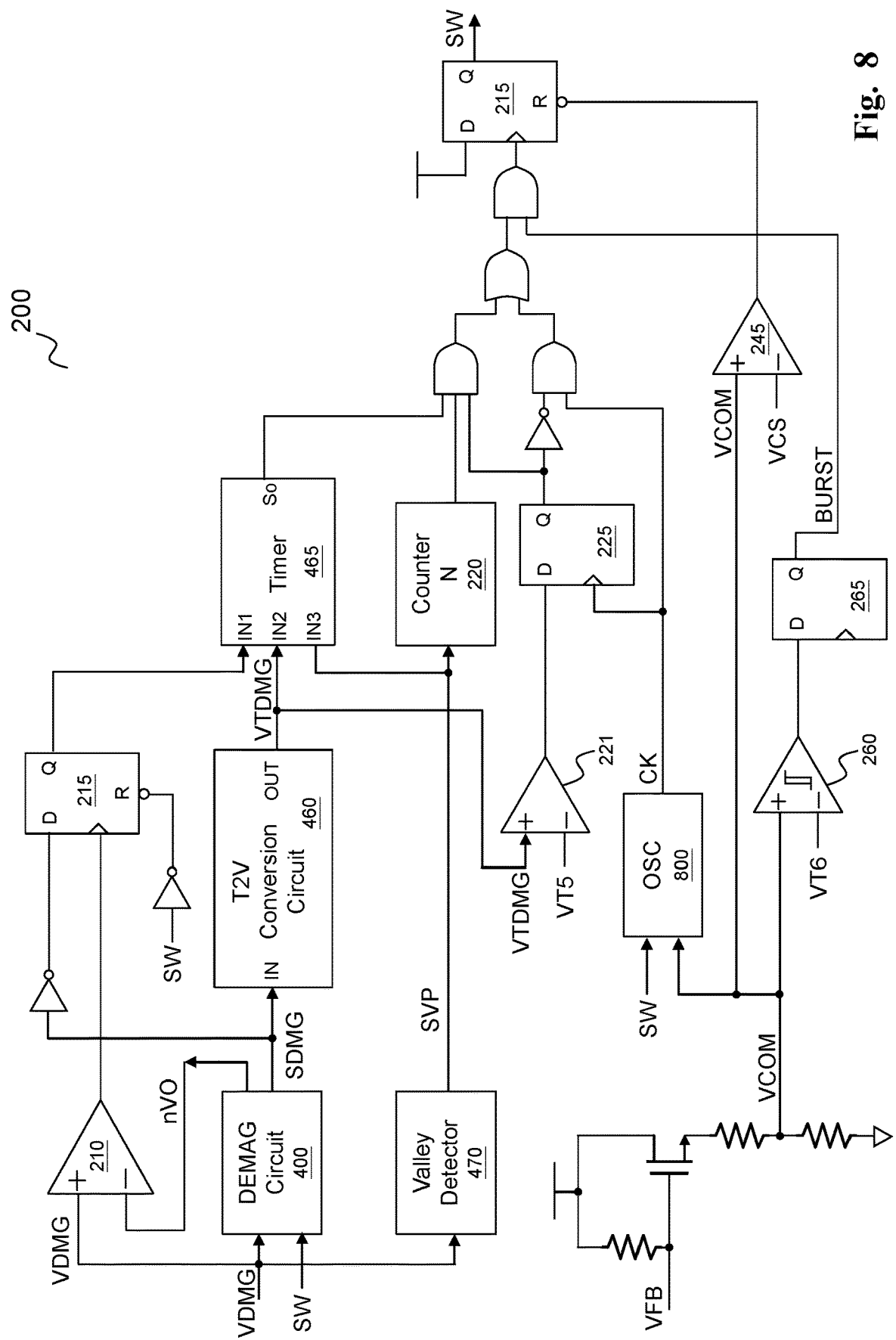
FIG. 8 shows a schematic diagram of an embodiment of primary side controller circuit for use in the ZVS control circuit according to the present invention.

FIG. 8 shows a schematic diagram of a preferred embodiment of the primary side controller circuit 200. The primary side controller circuit 200 includes a demagnetizing circuit 400 which is configured to operably generate an output voltage signal nVO correlated to the output voltage VO according to the primary side power transformer signal VDMG. Besides, the demagnetizing circuit 400 further generates a transformer demagnetizing signal SDMG that is correlated to the demagnetizing period of the transformer 10 according to the primary side power transformer signal VDMG.

The T2V conversion circuit 460 generates a voltage signal VTDMG according to the transformer demagnetizing signal SDMG. The level of the voltage signal VTDMG is correlated to the period (time length) of the demagnetizing period of the transformer 10 (e.g. T1 as shown in FIGS. 2A-2B). In one embodiment, the voltage signal VTDMG is coupled to a timer circuit 465 to determine a hold-up time. After the power transformer 10 is demagnetized, the timer circuit 465 further waits the hold-up time, and then the timer circuit 465 enables the generation of the switching signal SW. The delay time T2 (for generating the ZVS pulse in the SR signal SG) is shorter than the hold-up time, so that the ZVS pulse in the SR signal SG can be generated before the start of the switching signal SW.

Note that, since the delay time T2 is substantially inversely related to the pulse width T1 of the demagnetizing period of the power transformer 10, and the ZVS pulse (T3) and the switching signal SW are enabled consecutively after the delay time T2, hence, from this perspective, the secondary side controller circuit 100 generating the ZVS pulse in the SR signal SG and the primary side controller circuit 200 generating the switching signal SW are synchronized by the time length of the demagnetizing period of the power transformer 10.

The T2V conversion circuit 460 and the timer circuit 465 can be embodied in various ways respectively. In one embodiment, the T2V conversion circuit 460 can be embodied in the same way as the T2V conversion circuit in the embodiment of FIG. 6A. In one embodiment, the timer circuit 465 can be embodied in the same way as the timer circuit in the embodiment of FIG. 7.

Still referring to FIG. 8, in one embodiment, a valley detector 470 is coupled to receive the primary side power transformer signal VDMG and generate the valley signal SVP when the primary side power transformer signal VDMG is lower than a demagnetizing threshold VTHDMG. The valley signal SVP is coupled to the timer circuit 465 for determining whether to generate of the switching signal SW. In one embodiment, the switching signal SW will not start (the primary side controller circuit 200 will not switch the switching signal SW to the active level) unless the primary side power transformer signal VDMG is lower than the demagnetizing threshold VTHDMG. From one perspective, when the primary side power transformer signal VDMG becomes lower than the demagnetizing threshold VTHDMG after the ZVS pulse has started, it indicates that the ZVS pulse has ended.

Still referring to FIG. 8, in one embodiment, the valley signal SVP is further coupled to a counter 220 for counting a number (referred to as "second number" hereinafter) in response to the valley signal SVP. The counter 220 will disable the generation of the switching signal SW in response to a ZVS pulse detected signal (that is, the switching signal SW will not be generated in response to a ZVS pulse detected signal) when the second number exceeds a second number threshold N. In one embodiment, N is a positive integer. In this embodiment, from one perspective, when the second number exceeds the second number threshold N, it indicates that the output load of the output voltage VO is in a very light load condition because the primary side power transformer signal VDMG rings for too long or too many times. In this case, the generation of the switching signal SW in response to the ZVS pulse (through the ZVS pulse detected signal) is disabled. Instead, the switching signal SW will be generated according to another control scheme which will be explained later.

Still referring to FIG. 8, in one embodiment, one input of a comparator 210 receives the primary side power transformer signal VDMG and the comparator 210 compares it with the output voltage signal nVO to generate the ZVS pulse detected signal (corresponding to for example but not limited to the output of the comparator 210). The ZVS pulse detected signal is generated in response to the start of the active level of the ZVS pulse in the SR signal SG. More specifically, the ZVS pulse detected signal is generated when the primary side transformer signal VDMG is higher than the output voltage signal nVO of the demagnetizing circuit 400 (also referring to FIGS. 3A and 3B, the primary side transformer signal VDMG rises above the output voltage signal nVO at the start of the ZVS pulse). The output of the comparator 210 is connected to a flip-flop 215. After the end of demagnetizing period of the power transformer 10, the output of the flip-flop 215 (which for example is coupled to the timer circuit 465) is utilized to enable the start of the switching signal SW; that is, the switching signal SW will not start unless the ZVS pulse detected signal is detected (for example by triggering the flip-flop 215 at its clock input).

Therefore, referring to the control inputs IN1, IN2 and IN3 of the timer circuit 465 and the counter 220, in one preferred embodiment, when the output load of the output voltage VO is not lower than a light-load threshold, the switching signal SW is generated under the conditions (1) after the ZVS pulse detected signal is detected (IN1, corresponding to the start of the ZVS pulse), and (2) a valley signal SVP is generated after the ZVS pulse detected signal is detected (IN3, corresponding to the end of the ZVS pulse), and (3) after the timer circuit 465 waits the hold-up time according to the voltage signal VTDMG (IN2), and (4) that the second number of the counter 220 is not over the second number threshold N (output of the counter 220, corresponding to the output load of the output voltage VO being not too low).

However, when the output load of the output voltage VO is lower than a light-load threshold, in one preferred embodiment, the switching signal SW is generated according to another control scheme. Still referring to FIG. 8, in one embodiment, as shown in FIG. 8, an oscillator 800 is employed to generate the oscillation signal CK for determining the switching frequency of the switching signal SW when the output load of the output voltage VO is lower than the light-load threshold. Note that the voltage signal VTDMG generated by the T2V conversion circuit 460, which is related to the demagnetizing period obtained from the power transformer signal VDMG, corresponds to the level of the output load of the output voltage VO. In one embodiment, the voltage signal VTDMG is compared to a threshold VT5 by a comparator 221. If the voltage signal VTDMG is lower than the threshold VT5, which corresponds to that the output load of the output voltage VO is lower than the light-load threshold, the flip-flop 225 will enable an oscillation signal CK to control the frequency of the switching signal SW. In one embodiment, as shown in FIG. 8, the oscillation signal CK is generated in accordance with the feedback related signal VFB (through a voltage signal VCOM which can be for example a voltage related the feedback related signal VFB as shown in FIG. 8).

In one embodiment, the feedback related signal VFB is further coupled to a comparator 260 to be compared with a threshold VT6. The comparison result of the comparator 260 is sent to a flip-flop 265 to determine a burst mode switching period of the switching signal SW (which is indicated by the burst mode control signal BURST) when the output load of the output voltage VO is at light load or no-load condition, wherein "burst mode" refers to a mode in which the switching signal SW switches in several consecutive cycles (burst) and remains OFF in next multiple cycles.

Figure 9A:
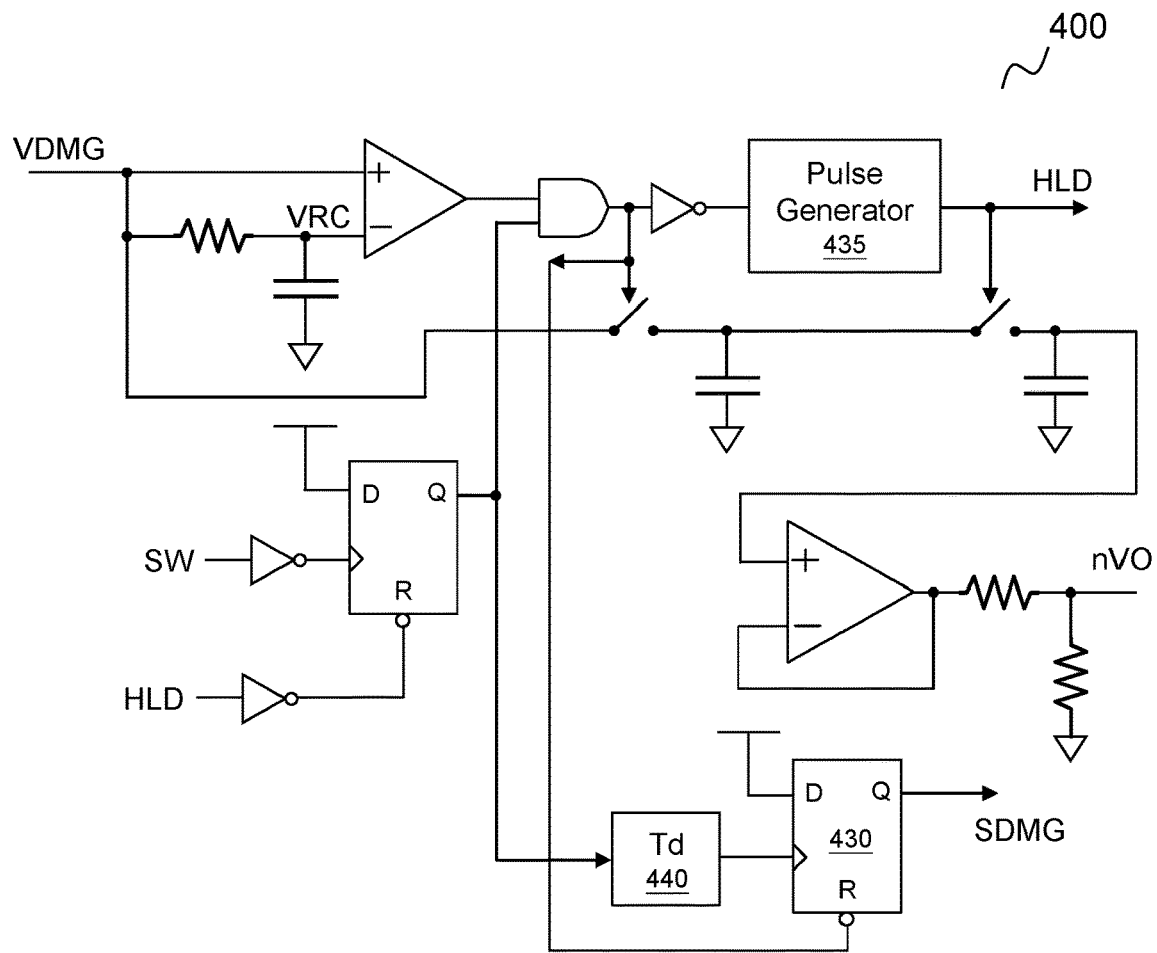
FIGS. 9A-9B show a schematic diagram and corresponding waveforms of an embodiment of the demagnetizing circuit for use in the ZVS control circuit according to the present invention.
Figure 9B:
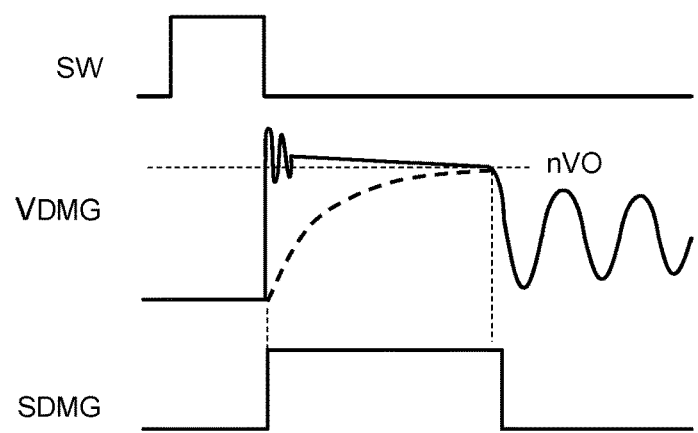

FIGS. 9A-9B show a schematic diagram and the corresponding waveforms of an embodiment of the demagnetizing circuit (demagnetizing circuit 400). In this embodiment, the demagnetizing circuit 400 generates the output voltage signal nVO and the transformer demagnetizing signal SDMG according to the primary side power transformer signal VDMG. More specifically, in this embodiment, the primary side power transformer signal VDMG is low-pass-filtered to generate a filtered signal VRC. The filtered signal VRC is compared with the primary side power transformer signal VDMG to generate sample-and-hold pulses by the pulse generator 435 to sample and hold the signal VDMG, so as to generate the output voltage signal nVO of the demagnetizing circuit 400. The flip-flop 430 and the delay circuit 440 are configured to generate the transformer demagnetizing signal SDMG according to the primary side power transformer signal VDMG and the switching signal SW.

Figure 10A:
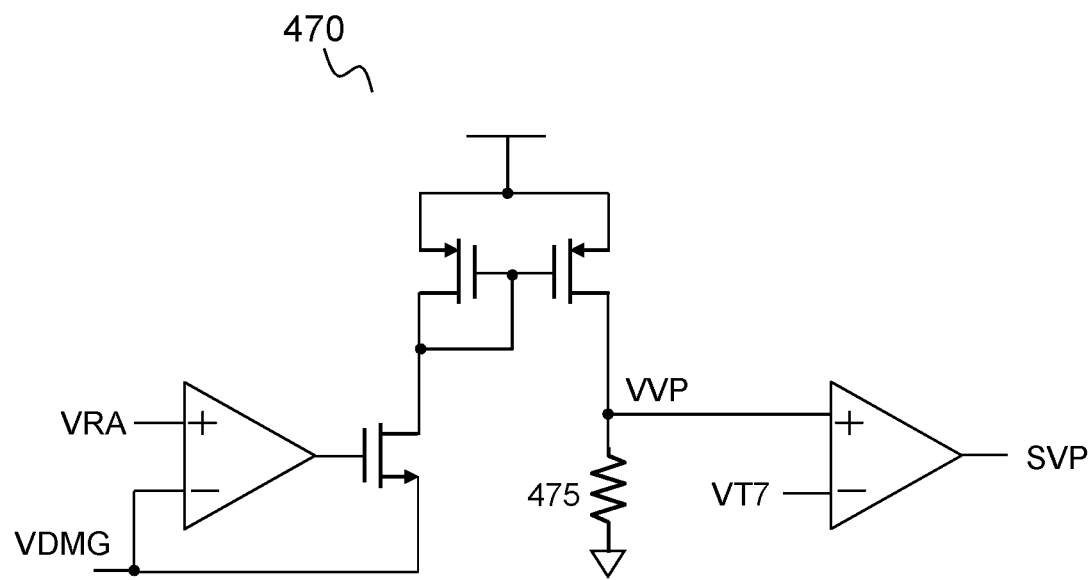
FIGS. 10A-10B show a schematic diagram and corresponding waveforms of an embodiment of the valley detector for use in the ZVS control circuit according to the present invention.
Figure 10B:
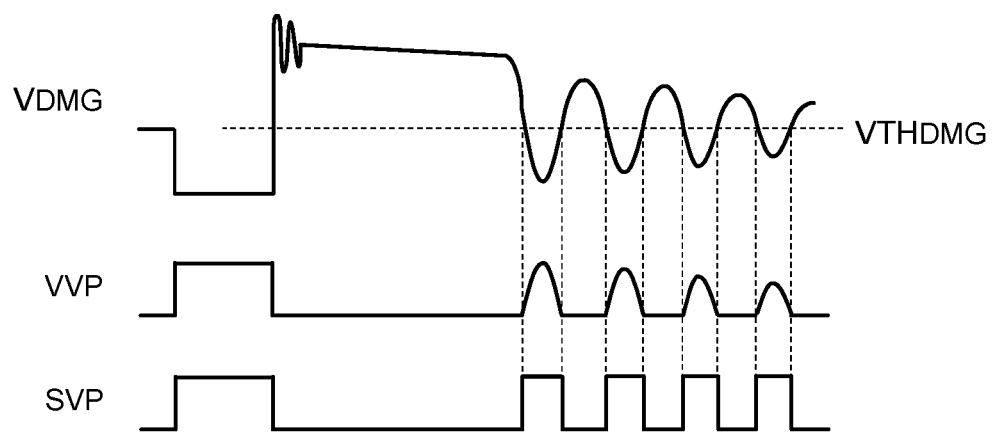

FIGS. 10A-10B show a schematic diagram and the corresponding waveforms of an embodiment of the valley detector (valley detector 470). The valley detector 470 generates the valley signal SVP in response to the primary side power transformer signal VDMG. In this embodiment, the aforementioned demagnetizing threshold VTHDMG relates to the reference voltage VRA, the resistance of the resistor 475 and the threshold voltage VT7 as shown in FIG. 10A. Referring to FIG. 10B, VVP is an internal signal which is a rectified and inversed version of the difference between the primary side power transformer signal VDMG and the reference voltage VRA.

Figure 11A:
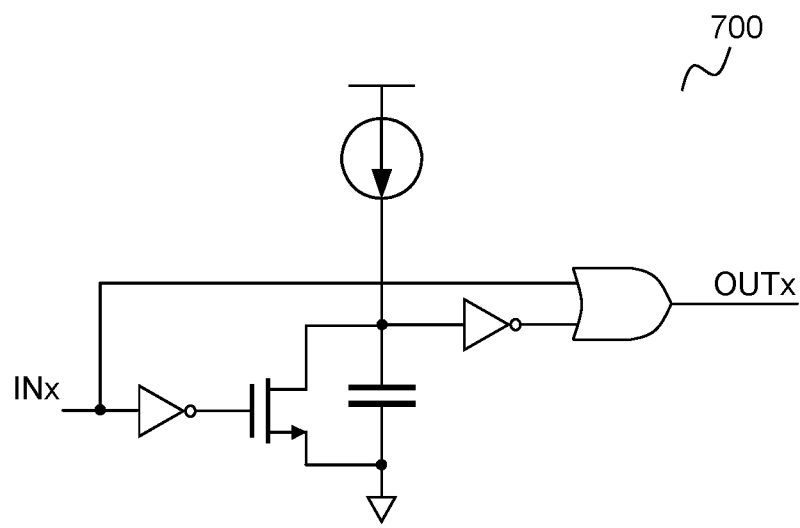
FIGS. 11A-11B show a schematic diagram and corresponding waveforms of an embodiment of the pulse generator for use in the ZVS control circuit according to the present invention.
Figure 11B:
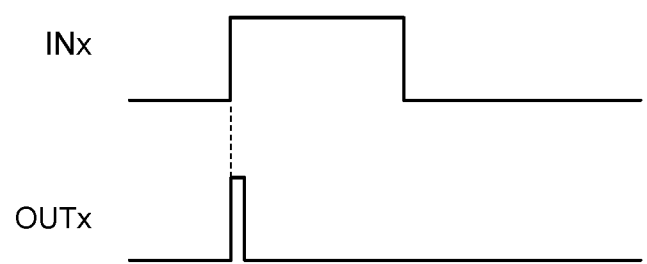

FIGS. 11A-11B show a schematic diagram and the corresponding waveforms of an embodiment of the pulse generator (corresponding to the pulse generator 700 in FIG. 5 or the pulse generator 435 in FIG. 9A). In one embodiment, as shown in FIGS. 11A-11B, the pulse generator 700 generates the pulse output signal OUTx according to the input signal INx. In this embodiment, the pulse output signal OUTx is triggered at the rising edge of the input signal INx.

Figure 12:
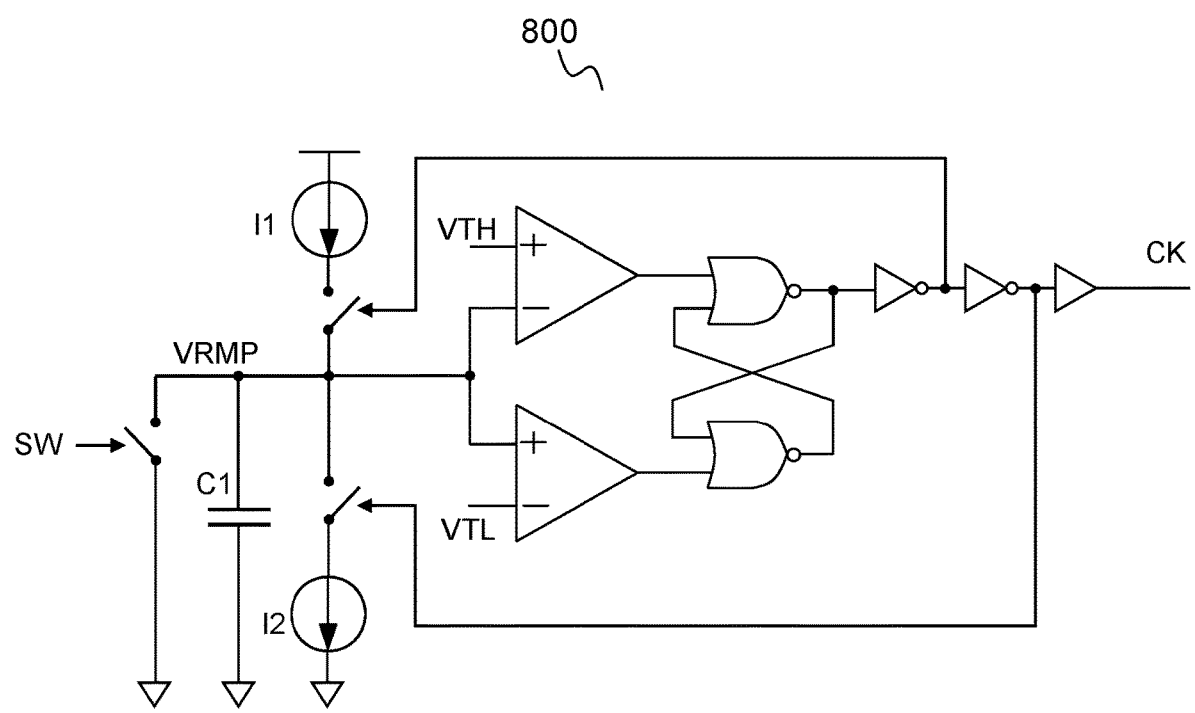
FIG. 12 shows a schematic diagram of an embodiment of an oscillator for use in the ZVS control circuit according to the present invention.

FIG. 12 shows a schematic diagram of an embodiment of an oscillator (oscillator 800). In this embodiment, the ramp voltage VRMP ramps between a higher threshold VTH and a lower threshold VTL in response to the switching signal SW, to generate the oscillation signal CK. When the oscillator 800 is employed in the embodiment of FIG. 8, the voltage signal VCOM for example can be arranged to adjust one or more of the current of the current source I1, the current of the current source I2, the capacitance of the capacitor C1, the higher threshold VTH, and/or the lower threshold VTL.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, it is not necessary to provide different control schemes for heavy load condition and light load condition; the flyback power converter and the ZVS control circuit can operate always according to the heavy load control scheme, and in this case, the circuit components related to the light load control scheme can be omitted. For another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A zero voltage switching (ZVS) control circuit, configured to operably control a flyback power converter including a power transformer having a primary side and a secondary side, the ZVS control circuit comprising:
    a primary side controller circuit, configured to operably generate a switching signal according to a feedback signal, wherein the switching signal controls a power transformer through a power transistor at the primary side to generate an output voltage at the secondary side; and
    a secondary side controller circuit, configured to operably generate the feedback signal, and generate an SR signal to control a synchronous rectifier transistor at the secondary side, wherein the SR signal includes an SR-control pulse and a ZVS pulse, wherein the SR-control pulse controls the synchronous rectifier transistor in response to a demagnetizing period of the power transformer, and wherein the ZVS pulse controls the power transformer through the synchronous rectifier transistor to determine a timing for starting the switching signal to achieve zero voltage switching for the power transistor;
    wherein the secondary side controller circuit generates the ZVS pulse after a delay time from an end of a demagnetizing period of the power transformer, wherein within the demagnetizing period, the power transformer is substantially demagnetized, and the delay time is determined according to a time length of the demagnetizing period, wherein the delay time is increased as the time length of the demagnetizing period of the power transformer is decreased.

2. The ZVS control circuit of claim 1, wherein the delay time is determined in accordance with an output load of the output voltage, and the delay time is increased as the output load of the output voltage is decreased.

3. The ZVS control circuit of claim 1, further comprising an opto-coupler configured to operably couple the feedback signal from the secondary side controller circuit to the primary side controller circuit to control a pulse width of the switching signal; wherein the feedback signal is generated in accordance with the output voltage.

4. The ZVS control circuit of claim 1, wherein a switching frequency of the switching signal is determined by the ZVS pulse.

5. The ZVS control circuit of claim 1, wherein the secondary side controller circuit generating the ZVS pulse and the primary side controller circuit generating the switching signal are synchronized by the time length of the demagnetizing period of the power transformer.

6. The ZVS control circuit of claim 1, wherein the primary side controller circuit includes an oscillator configured to operably generate an oscillation signal which determines the switching frequency of the switching signal when the output load of the output voltage is lower than a light-load threshold.

7. The ZVS control circuit of claim 6, wherein the oscillation signal is generated in accordance with the feedback signal.

8. The ZVS control circuit of claim 1, wherein the switching period of the switching signal is determined according to the feedback signal when the output load of the output voltage is lower than a light-load threshold.

9. The ZVS control circuit of claim 1, wherein the secondary side controller circuit is configured to operably receive a secondary side power transformer signal, and the ZVS pulse is generated when the secondary side power transformer signal is lower than an SR threshold.

10. The ZVS control circuit of claim 1, wherein the secondary side controller circuit further includes a first counter which is configured to operably count a first number according to a first valley signal; wherein the first valley signal is generated when the secondary side power transformer signal is lower than an SR threshold, and the secondary side controller circuit disables generation of the ZVS pulse when the first number exceeds a first number threshold.

11. The ZVS control circuit of claim 1, wherein the primary side controller circuit is coupled to the power transformer to receive a primary side power transformer signal, and the primary side controller circuit enables to start the switching signal after a ZVS pulse detected signal is detected; wherein the ZVS pulse detected signal is generated according to a level of the primary side power transformer signal, and the level of the primary side power transformer signal rises at the start of the ZVS pulse.

12. The ZVS control circuit of claim 1, wherein the primary side controller circuit is coupled to the power transformer to receive a primary side power transformer signal; wherein the primary side controller circuit will not start the switching signal unless the primary side power transformer signal is lower than a demagnetizing threshold.

13. The ZVS control circuit of claim 1, wherein the primary side controller circuit further includes a second counter configured to operably count a second number in response to a second valley signal, wherein the second valley signal is generated when the primary side power transformer signal is lower than a demagnetizing threshold; and when the second number exceeds a second number threshold, the primary side controller circuit does not generate the switching signal in response to the ZVS signal.

14. The ZVS control circuit of claim 1, wherein the secondary side controller circuit includes:
    a time to voltage conversion circuit, configured to operably generate a voltage signal according to a voltage-drop across the synchronous rectifier transistor, wherein the voltage signal is positively correlated to the time length of the demagnetizing period; and a timer circuit, configured to operably generate the delay time according to the voltage signal, wherein the delay time is increased as the voltage signal is decreased.

* * * * *